April 1, 1924.
G. L. McFANN
1,488,645
ROTARY TABLE AND BUSHING FOR WELL DRILLS
Filed June 27, 1921
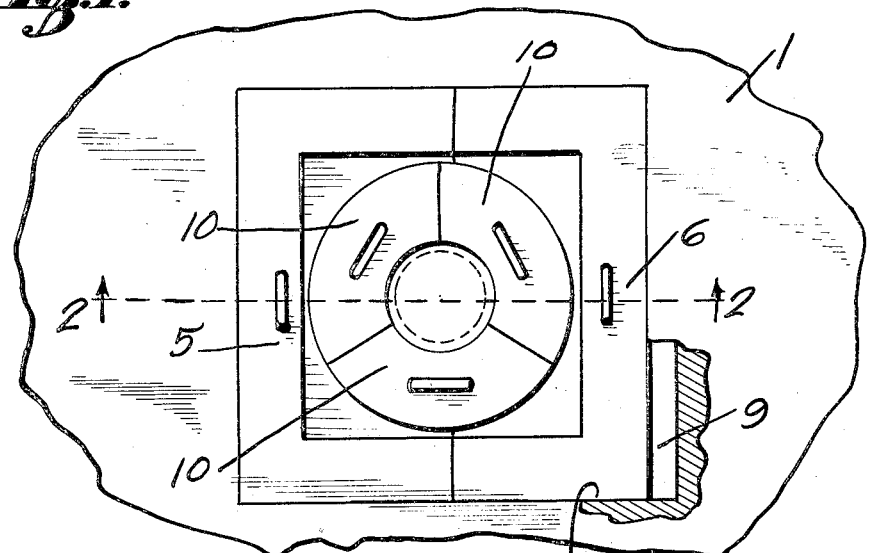
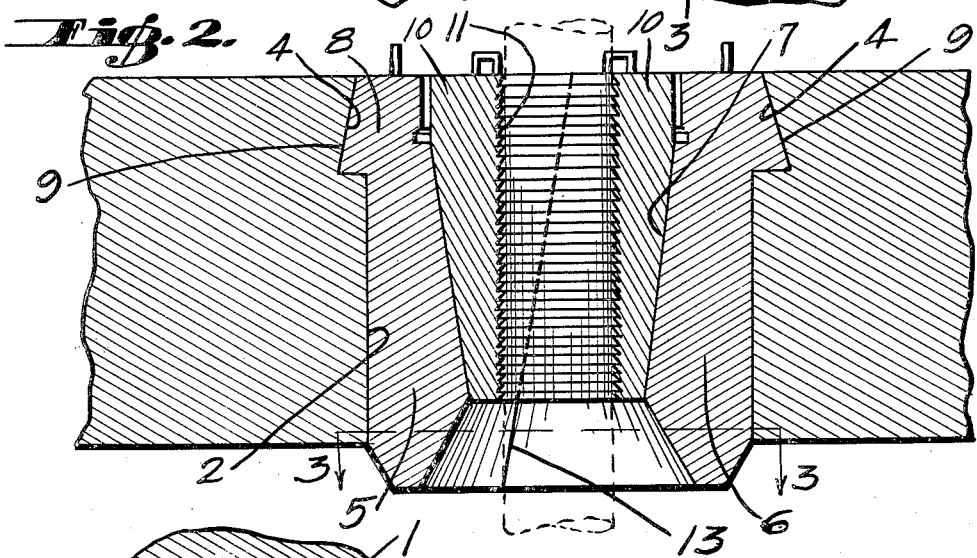
George L. McFann
INVENTOR.
BY
Hazard & Miller
ATTORNEYS.

Patented Apr. 1, 1924.

1,488,645

UNITED STATES PATENT OFFICE.

GEORGE L. McFANN, OF WHITTIER, CALIFORNIA, ASSIGNOR TO WILSON & WILLARD MFG. CO., OF LOS ANGELES, CALIFORNIA, A CORPORATION OF CALIFORNIA.

ROTARY TABLE AND BUSHING FOR WELL DRILLS.

Application filed June 27, 1921. Serial No. 480,636.

*To all whom it may concern:*

Be it known that I, GEORGE L. McFANN, a citizen of the United States, residing at Whittier, in the county of Los Angeles and State of California, have invented new and useful Improvements in Rotary Tables and Bushings for Well Drills, of which the following is a specification.

It is the object of this invention to provide a bushing and slip construction employed in connection with a rotary drill table for holding the drill pipe in suspension, said construction forming means whereby the bushing will be positively held against displacement when the pipe and slips are elevated, but which will permit of ready removal of the bushing when the slips have been withdrawn therefrom.

The invention will be readily understood from the following description of the accompanying drawings, in which:

Figure 1 is a fragmentary plan view of a rotary drill table and showing the improved bushing and slip construction.

Fig. 2 is a vertical section on the line 2—2 of Fig. 1.

Fig 3 is a horizontal section on the line 3—3 of Fig. 2.

The rotary drill table 1 may be of usual construction and is provided with the usual circular bore 2 which at its upper end terminates in an enlargement adapted to receive the collar of the bushing, and which is preferably square in cross section.

One pair of opposite sides of the squared enlargement of the bore is provided with vertical surfaces 3, while the other pair of opposite sides of said enlargement is provided with undercut inclined surfaces 4.

The bushing received in the bore, as thus described, is formed of sections 5 and 6 which, when assembled, provide a tapering bore 7. The assembled bushing is adapted to fit snugly within bore 2 and is provided with a collar 8 at its upper end which fits the enlarged squared opening at the upper end of the bore 2. For this purpose the collar is provided with one pair of opposite sides having vertical surfaces adapted to slide freely along vertical surfaces 3, while the other pair of opposite sides of the collar form downwardly divergent inclined surfaces 9 adapted to fit against the undercut surfaces 4, so that when the bushing is in position, as shown in Fig. 2, it will be held against axial elevation through impingement of the inclined surfaces of the collar of the bushing against the undercut inclined surfaces at the end of the bore extending through the rotary table.

The bushing, as thus described, is adapted to receive usual segmental slips 10 through the tapering bore 7 thereof, said slips having usual outer inclined surfaces and usual inner notched surfaces 11, so that the slips will wedge in bore 7 and will engage a usual pipe section for holding the latter in suspension.

With the construction as thus described, in operation it will be noted that the slips will hold the pipe in suspension in usual manner, while permitting of elevation of said pipe so as to release the slips and permit of the desired movement of the pipe. It will be noted, however, that displacement of the bushing, while thus elevating the pipe to release the slips, will be positively prevented.

In order to provide for the removal of the bushing and the ready assembling of the parts in operative position, the bushing sections 5 and 6 have meeting edges forming a bushing which is split along a line inclined with relation to the bushing, and as clearly shown at 13 in Fig. 2. This split in the bushing extends parallel to one pair of the inclined surfaces 4 and 9 and is so arranged as to split bore 7 along a line which will form the grooves in the respective bushing sections 5 and 6, and which co-operate to provide bore 7 with a minimum width at the surfaces of split 13 which is greater than the diameter of the pipe engaged by the slips of the apparatus.

The construction as thus described provides for the ready removal or positioning of the bushing when so desired, while still affording positive means, as previously described, for maintaining the bushing against longitudinal movement when the parts are assembled for operation. Such a removal or placing in position of the bushing, is accomplished with slips 10 removed so as to permit of some lateral play of the bushing sections, and by means of said lateral play, the bushing section is adapted for movement along the parallel lines of surfaces 9 and 13 to slide said bushing section past abutment surface 4. With bushing section 5 removed, the other bushing section may be readily inserted in position or removed therefrom, by shifting the same laterally a sufficient distance to cause the inclined surface 9 of said bushing section to clear the inclined abutment surface 4.

Although I have specifically described my invention as being adapted for the reception of slips, it is to be understood that the bushing may also receive a driving bushing as used in oil rigs, instead of the slips.

Various changes may be made without departing from the spirit of the invention as claimed.

What is claimed is:

1. The combination with a rotary table, of a bushing received therein with slips adapted to be received in said bushing, said bushing being split longitudinally at an inclination to the axis thereof, and said bushing and table having co-operating surfaces preventing axial displacement of said bushing when said slips are in position, the parts being so arranged as to permit withdrawal of one of said bushing sections along the line of said inclined split and past its co-operating surface, when the slips are removed.

2. The combination with a rotary table, of a bushing received therein with slips adapted to be received in said bushing, said bushing being split longitudinally at an inclination to the axis thereof, the bore of said table receiving said bushing having an enlarged end having undercut inclined surfaces at opposite sides thereof, the end of said bushing having a collar provided with co-operating downwardly divergent inclined surfaces at opposite sides thereof, the impingement of said surfaces preventing axial displacement of said bushing when said slips are in position, one of said inclined surfaces and said split in the bushing being parallel so as to permit of withdrawal of one of said bushing sections along the line of said inclined split and past its co-operating surface, when the slips are removed.

3. The combination with a rotary table, of a bushing received therein with slips adapted to be received in said bushing, said bushing being split longitudinally at an inclination to the axis thereof, the bore of said table receiving said bushing having an enlarged squared end having undercut inclined surfaces at opposite sides thereof, the end of said bushing having a squared collar received in said squared enlargement and provided with downwardly divergent inclined surfaces at opposite sides thereof arranged to co-operate with the inclined surfaces of said bore to prevent axial displacement of said bushing when said slips are in position, one pair of said inclined surfaces and said split in the bushing being parallel so as to permit of withdrawal of one of said bushing sections along the line of said inclined split and past its co-operating surface, when the slips are removed.

4. In combination, a rotary table, a bushing received therein with slips adapted to be received in said bushing, said bushing being formed of sections, said bushing and table having cooperating surfaces for preventing axial displacement of the bushing when the slips are in position.

5. In combination, a table, a bushing within the table formed of sections, co-acting surfaces formed on the bushing sections and table for preventing axial displacement of the bushing, and slips removably fitted in the bushing.

6. In combination, a rotary table, a bushing received therein with slips adapted to be received in said bushing, said bushing being formed in sections and having one end formed with a collar provided with cooperating downwardly divergent inclined surfaces for the purpose described.

7. In combination, a table, a bushing within the table formed in sections, and co-active surfaces formed on the sections and table for preventing axial elevation of the bushing.

8. In combination, a rotary table having a bore, a bushing received therein formed of sections and having one end provided with a collar, co-operating downwardly divergent surfaces formed on said collar, and upwardly divergent surfaces on said bore co-operating with the surfaces of said collar in the manner and for the purpose described.

In testimony whereof I have signed my name to this specification.

GEORGE L. McFANN.